United States Patent
Scharfenberger et al.

(10) Patent No.: US 12,506,840 B2
(45) Date of Patent: Dec. 23, 2025

(54) CONVERTING INPUT IMAGE DATA FROM A PLURALITY OF VEHICLE CAMERAS OF A SURROUND-VIEW SYSTEM INTO OPTIMISED OUTPUT IMAGE DATA

(71) Applicant: Continental Autonomous Mobility Germany GmbH, Ingolstadt (DE)

(72) Inventors: Christian Scharfenberger, Lindau (DE); Michelle Karg, Lindau (DE)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 417 days.

(21) Appl. No.: 17/757,735

(22) PCT Filed: Dec. 9, 2020

(86) PCT No.: PCT/DE2020/200112
§ 371 (c)(1),
(2) Date: Jun. 20, 2022

(87) PCT Pub. No.: WO2021/121491
PCT Pub. Date: Jun. 24, 2021

(65) Prior Publication Data
US 2023/0342894 A1    Oct. 26, 2023

(30) Foreign Application Priority Data
Dec. 19, 2019   (DE) ............... 10 2019 220 171.7

(51) Int. Cl.
*G06K 9/00* (2022.01)
*G06T 5/00* (2006.01)
(Continued)

(52) U.S. Cl.
CPC ............. *G06T 5/50* (2013.01); *G06T 5/00* (2013.01); *H04N 23/90* (2023.01);
(Continued)

(58) Field of Classification Search
CPC ............ G06T 7/44; G06T 2207/10016; G06K 9/6256; G06K 9/46; G06N 20/00
See application file for complete search history.

(56) References Cited

U.S. PATENT DOCUMENTS

| | | | | |
|---|---|---|---|---|
| 11,321,815 | B2 * | 5/2022 | Meinke | ............. G06N 3/08 |
| 2010/0054542 | A1 * | 3/2010 | Archibald | ........... H04N 19/176 |
| | | | | 382/168 |

(Continued)

FOREIGN PATENT DOCUMENTS

| | | | | |
|---|---|---|---|---|
| CN | 107306338 A | * | 10/2017 | ............ B60R 1/00 |
| CN | 107380054 A | * | 11/2017 | ............ B60Q 1/085 |
| DE | 102014210323 A1 | | 12/2015 | |

OTHER PUBLICATIONS

An Encoder-Decoder Based Convolution Neural Network (CNN) for Future Advanced Driver Assistance System (ADAS), Robail Yasrab et al., MDPI, 2017, pp. 1-21 (Year: 2017).*
Advanced Driver-Assistance Systems, Vipin Kumar Kukkala et al., IEEE, 2018, pp. 18-25 (Year: 2018).*
Object Classification Using CNN-Based Fusion of Vision and LIDAR in Autonomous Vehicle Environment, Hongbo Gao et al., IEEE, 2018, pp. 4224-4231 (Year: 2018).*

(Continued)

*Primary Examiner* — Jayesh A Patel

(57) ABSTRACT

The present disclosure relates to a machine learning method, to a method and to a device for converting input image data from a plurality of vehicle cameras of a panoramic-view system into optimized or enhanced output image data. The method for converting input image data from a plurality of vehicle cameras of a panoramic-view system into optimized or enhanced output image data includes input image data acquired by the vehicle cameras and having a current brightness or color distribution provided to a trained artificial neural network. the trained artificial neural network is configured to convert the input image data having the current brightness or color distribution into optimized or enhanced output image data having different output bright- (Continued)

ness or color distribution; and the trained artificial neural network is configured to output the output image data.

16 Claims, 3 Drawing Sheets

(51) Int. Cl.
*G06T 5/50* (2006.01)
*H04N 23/90* (2023.01)

(52) U.S. Cl.
CPC .............. *G06T 2207/20081* (2013.01); *G06T 2207/20084* (2013.01); *G06T 2207/30252* (2013.01)

(56) References Cited

U.S. PATENT DOCUMENTS

| | | | | |
|---|---|---|---|---|
| 2017/0134713 | A1* | 5/2017 | Lin | H04N 13/282 |
| 2017/0297488 | A1* | 10/2017 | Wang | G06T 5/80 |
| 2017/0337464 | A1* | 11/2017 | Rabinowitz | G06F 17/16 |
| 2018/0144249 | A1* | 5/2018 | Nagato | G06F 8/36 |
| 2019/0005603 | A1* | 1/2019 | Chen | G06N 3/048 |
| 2019/0019311 | A1 | 1/2019 | Hu et al. | |
| 2019/0095877 | A1* | 3/2019 | Li | G06V 20/63 |
| 2019/0164261 | A1* | 5/2019 | Sunkavalli | G06T 7/90 |
| 2019/0346844 | A1* | 11/2019 | Chen | G05B 13/0265 |
| 2020/0051217 | A1* | 2/2020 | Shen | G06T 7/11 |
| 2020/0051260 | A1* | 2/2020 | Shen | G06N 20/00 |
| 2020/0294194 | A1* | 9/2020 | Sun | H04N 23/698 |

OTHER PUBLICATIONS

Automatic Photo Adjustment Using Deep Neural Networks, Zhicheng Yan et al., ACM, 2016, pp. 11-1 to 11-15 (Year: 2016).*
Change Detection from a Street Image Pair using CNN Features and Superpixel Segmentation, Ken Sakurada et al., 2015, pp. 1-12 (Year: 2015).*
German National Search Report dated Oct. 2, 2020 for the counterpart German Application No. 10 2019 220 171.1.
The International Search Report and the Written Opinion of the International Searching Authority mailed on Jun. 9, 2021 for the counterpart PCT Application No. PCT/DE2020/200112.
Zeshan Khan, et al., "FHDR: HDR Image Reconstruction from a Single LDR Image using Feedback Network", IEEE Global Conference on Signal and Information Processing, Nov. 11-14, 2019, pp. 1-5, 978-17281-2723-1/19.
Wikipedia, "Künstliches neuronales Netz", Wikipedia translation, "Artificial neural network", https://de.wikipedia.org/wiki/K%C3%BCnstliches_neuronales_Netz.
Wikipedia, "Überwachtes Lernen", Wikipedia translation "Supervised learning", https://de.wikipedia.org/wiki/%C3%9Cberwachtes_Lernen.
Wikipedia, "Supervised Learning," Oct. 10, 2019, https://en.wikipedia.org/w/index.php?title=Supervised_learning&oldid=920525193.
Wikipedia, "Artificial Neural Network," Dec. 18, 2019, https://en.wikipedia.org/w/index.php?title=Artificial_neural_network&oldid=931378665.
European Examination Report dated Sep. 25, 2025 for the counterpart European Patent Application Number 20 841 885.5 and machine translation of same.

* cited by examiner

CONVERTING INPUT IMAGE DATA FROM A PLURALITY OF VEHICLE CAMERAS OF A SURROUND-VIEW SYSTEM INTO OPTIMISED OUTPUT IMAGE DATA

CROSS-REFERENCE TO RELATED APPLICATION

This U.S. patent application claims the benefit of PCT patent application No. PCT/DE2020/200112, filed Dec. 9, 2020, which claims the benefit of German patent application No. 10 2019 220 171.7, filed Dec. 19, 2019, both of which are hereby incorporated by reference.

TECHNICAL FIELD

The invention relates to a machine learning method, to a method and to a device for converting input image data from a plurality of vehicle cameras of a panoramic view system into optimized output image data.

BACKGROUND

Today's vehicles are increasingly equipped with surround-view and/or assistance systems which monitor the regions in front of, next to or behind the vehicle. This is used to either recognize objects in order to avoid collisions, to recognize road boundaries, to keep the vehicle within a lane or to simply display the surroundings in order to provide assistance during a parking process.

These systems work with high-resolution cameras which, nowadays, have an increasingly higher dynamic range. In particular, display and recognition functions benefit from the latter in situations which have different levels of brightness and contrast.

DE 102014210323 A1 discloses a device and a method for adaptive image correction of at least one image parameter of a camera image having: multiple cameras for producing camera images, wherein the camera images from neighboring cameras each have overlapping image regions; and having an image processing unit which combines the camera images produced by the cameras to create a composite overall image; wherein the image processing unit has an image correction component which calculates multiple average image parameter levels of the image parameter in the overlapping image regions of the camera image for each received camera image, and sets the respective image parameter as a function of the calculated average image parameter levels.

The aforementioned systems demonstrate very good performance in scenarios which are sufficiently illuminated by daylight, street lighting or the beam of a vehicle's headlights. However, deteriorations occur both in the recognition of objects and during the representation of the surroundings or of objects as soon as a situation exists where there is only a little or no ambient light available to illuminate the scenario.

One prominent example would be driving on an unlit country road at night. The vehicle is equipped with a surround-view system which is supposed to offer both assistance and display functions while driving. While the vehicle illuminates the front and rear regions thanks to the headlights and taillights, the region next to the vehicle is virtually unlit.

A further example would be parking a vehicle in a dark corner in a parking garage. Here as well it is the case that, especially in parking positions next to walls or other vehicles, there is too little light or no light at all available for the side cameras.

This can be remedied by additional lamps which are installed in the side regions of the vehicle and illuminate the critical regions next to the vehicle. For complete illumination, however, a high number of lamps is necessary, which, in addition to critical design restrictions, can lead to considerable additional costs in the vehicle.

Known algorithmic methods such as gamma correction, automatic white balance or histogram equalization can lighten up and improve the images algorithmically. The latter, however, show significant performance losses, especially in the dark, due to a lack of color information in the image.

A system would therefore be desirable which algorithmically makes it possible to upgrade the unilluminated regions without additional lighting.

BRIEF SUMMARY

It is the object of the present disclosure to provide solutions for this.

The object is addressed by the subject-matter of the independent claims. Advantageous embodiments are the subject-matter of the dependent claims, the following description and the figures.

A method for machine learning of a conversion of input image data from multiple vehicle cameras of a panoramic view system into optimized output image data by means of an artificial neural network provides that the learning is effected with a multiplicity of training image pairs in such a manner that, respectively, a first image having a first brightness or color distribution is provided at the input of the artificial neural network and a second image of the same scene having a different second brightness or color distribution is provided as the target output image. The artificial neural network can be, for example, a convolutional neural network (CNN). The vehicle cameras are arranged and configured in such a manner that, taken together, they capture and image the region surrounding the vehicle.

In one embodiment, the training image pairs are produced, in each case, by acquiring a first image having a first brightness and a second image having a second brightness simultaneously or immediately one after another with different exposure times. A first, shorter exposure time leads to a darker training image and a second, longer exposure time leads to a lighter training image. For example, the respective vehicle camera is stationary (immobile) with respect to the surroundings to be captured during the production of the training data. To this end, the training data may be captured with at least one vehicle camera of a stationary vehicle, for example. The scene captured by the vehicle camera may, for example, contain static surroundings, that is to say without any moving objects.

In one embodiment, (only) one artificial neural network is trained jointly or simultaneously for all of the vehicle cameras. A sequence of successive images may in each case be used for each individual camera for the joint training.

The temporal correlation of images may be taken into account in a profitable manner during training and/or during the utilization of the trained network.

Information about image features and the target output image data thereof may be used, which are acquired at a point in time t by a front camera and at a later point in time by a side camera or the rear camera. As a result, training may be provided to ensure that an object having certain image features has an identical brightness and color in the output images of all of the individual cameras.

According to one embodiment, at least one factor d is established as the measure of the difference between the second and the first brightness or color distribution of a training image pair and is provided to the artificial neural network as part of the training.

The factor d may be established, for example, as the relationship of the second brightness or color distribution to the first brightness or color distribution. The brightness may in particular be established as the mean brightness of an image or on the basis of a luminance histogram of an image.

In one embodiment, the artificial neural network has a common input interface for two separate output interfaces. The common input interface has shared feature representation layers. Converted image data are output at the first output interface. ADAS-relevant detections of at least one ADAS detection function are output at the second output interface. ADAS stands for Advanced Driver Assistance Systems. Consequently, ADAS-relevant detections are, e.g., objects, items or road users which represent important input variables for ADAS/AD systems. The artificial neural network comprises ADAS detection functions, e.g., lane recognition, object recognition, depth recognition (3D estimation of the image components), semantic recognition, or the like. As part of the training, the outputs of both output interfaces are optimized.

A method for converting input image data from a plurality of vehicle cameras of a panoramic view system into optimized output image data comprises the following steps:
 a) input image data acquired by the vehicle cameras and having a current brightness or color distribution are provided to a trained artificial neural network;
 b) the trained artificial neural network is configured to convert the input image data having the current brightness or color distribution into output image data (Opti) having different output brightness or color distribution; and
 c) the trained artificial neural network is configured to output the output image data.

The output image data, which are optimized in terms of their brightness or color distribution, advantageously make it possible to better combine the images from the individual vehicle cameras to produce a combined image which may be displayed to the driver.

In one embodiment, a factor d is additionally provided to the trained artificial neural network in step a) and the (strength or degree of) conversion is controlled as a function of the factor d in step b).

According to one embodiment, the conversion in step b) takes place in such a manner that a vision enhancement in terms of overexposure is attained. For example, as part of the training, the concept of reducing the brightness of overexposed images or of adjusting the color distribution thereof was learnt.

In one embodiment, the input image data having the current brightness are converted into output image data having a longer (virtual) exposure time in step b). This offers the advantage of avoiding motion blur.

According to one embodiment, the factor d is estimated and, during the estimation, the brightness or color distribution of the current captured image data (e.g., luminance histogram or average brightness) or of the previously captured image data or the history of the factor d is taken into account.

For example, too high a brightness indicates overexposure, while too low a brightness indicates underexposure. Both may be ascertained by means of corresponding threshold values and corrected by a corresponding conversion.

In one embodiment, a separate factor d is estimated or determined for each of the vehicle cameras. This makes it possible to convert image data from the individual vehicle cameras individually, in particular as a function of the current brightness or color distribution of the image from the respective vehicle camera.

In one embodiment, following a recognition that at least two image regions of a currently captured image have a (significantly) different image brightness, a different factor d is estimated or determined for each of the image regions. If image regions having different illumination intensities exist, the factor d may consequently vary within an image and image regions having different factors d are determined via brightness estimations. The brightness enhancement may consequently be adapted to individual image regions.

According to one embodiment, a temporal development of the factor d may be taken into account during the determination or estimation of the factor d.

To this end, the temporal development of the factor d and a sequence of input images are included in the estimation. Information about the temporal development of the brightness may also be enlisted for image regions having different factors d.

According to one embodiment, information about the current surroundings of the vehicle is taken into account when determining the factor d. The estimation of the factor d may take into account further scene information such as information about the surroundings (country road, town, highway, tunnel, underpass), which is obtained via image processing from the sensor data or data from a navigation system (e.g., GPS receiver having a digital map).

For example, the factor d may be estimated based on information about the surroundings and from the temporal sequence of images and from the history of the factor d.

The factor d may consequently be estimated dynamically when utilizing a trained artificial neural network.

In one embodiment, the converted image data are output to at least one ADAS detection function which establishes and outputs ADAS-relevant detections. ADAS detection functions may include known edge or pattern recognition methods as well as recognition methods which may recognize and optionally classify relevant image objects by means of an artificial neural network.

In an alternative embodiment, the approach may be extended and the artificial neural network for converting the image data may be combined with a neural network for ADAS detection functions, e.g., lane recognition, object recognition, depth recognition, or semantic recognition. Consequently, this scarcely causes any additional outlay in terms of computing time. Following the training, the (first) output interface for outputting the converted image data may be eliminated so that, when utilized in the vehicle, only the (second) output interface is available for the ADAS detections.

The present disclosure further relates to a device having at least one data processing unit which is configured to convert input image data from a plurality of vehicle cameras of a panoramic view system into optimized output image data. The device comprises: an input interface, a trained artificial neural network and a (first) output interface.

The input interface is configured to receive input image data having a current brightness or color distribution from the vehicle cameras. The trained artificial neural network is configured to convert the input image data, which have a first brightness or color distribution, into output image data having different output brightness or color distribution.

The (first) output interface is configured to output the converted image data.

The device or the data processing unit may in particular be a microcontroller or multiprocessor, a central processing unit (CPU), a graphic processing unit (GPU), a digital signal processor (DSP), an ASIC (Application Specific Integrated Circuit), an FPGA (Field Programmable Gate Array) and the like, as well as software for carrying out the corresponding method steps.

According to one embodiment, the data processing unit is implemented in a hardware-based image pre-processing stage (Image Signal Processor, ISP).

In one embodiment, the trained artificial neural network for converting input image data into output image data having optimized brightness or color distribution is part of an onboard ADAS detection neural network, e.g., for semantic segmentation, lane detection or object detection, having a shared input interface (input or feature representation layers) and two separate output interfaces (output layers). The first output interface is configured to output the converted output image data and the second output interface is configured to output the ADAS detections (image recognition data).

The present disclosure further relates to a computer program element which, when a data processing unit is programmed therewith, instructs the data processing unit to carry out a method for converting input image data from the vehicle cameras into optimized output image data.

The present disclosure further relates to a computer-readable storage medium on which such a program element is stored.

The present disclosure further relates to the use of a method for machine learning of a conversion of input image data from multiple vehicle cameras of a panoramic view system into optimized output image data for training an artificial neural network of a device having at least one data processing unit.

The present disclosure may consequently be implemented in digital electronic circuits, computer hardware, firmware, or software.

BRIEF DESCRIPTION OF THE DRAWINGS

Example embodiments and figures are described in greater detail below, wherein.

DETAILED DESCRIPTION

Figure 1:
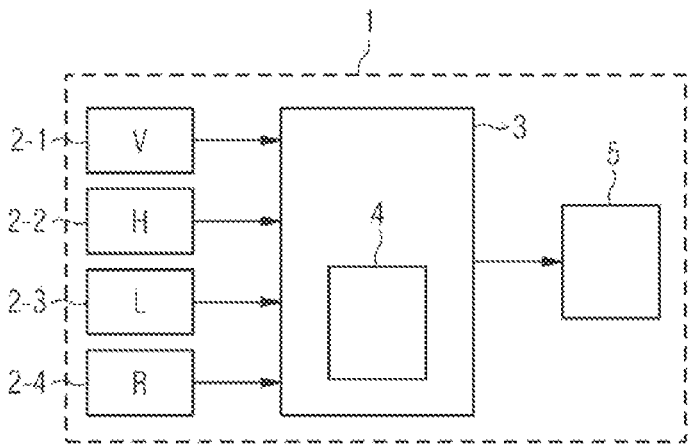
FIG. 1: shows a first schematic representation of a device according to the present disclosure in one embodiment.

As can be discerned from FIG. 1, a device 1 according to the present disclosure for converting input image data from multiple vehicle cameras of a panoramic view system into optimized output image data may have multiple units or circuit components. In the case of the example embodiment depicted in FIG. 1, the device for adaptive image correction has multiple vehicle cameras 2-$i$ which each produces camera images or video data. In the case of the example embodiment depicted in FIG. 1, the device 1 has four vehicle cameras 2-$i$ for producing camera images. The number of the vehicle cameras 2-$i$ may vary for different applications. The device 1 according to the example embodiment has at least two vehicle cameras for producing camera images. The camera images from neighboring vehicle cameras 2-$i$ typically have overlapping image regions.

The device 1 contains a data processing unit 3 which combines the camera images produced by the vehicle cameras 2-$i$ to create a composite overall image. As depicted in FIG. 1, the data processing unit 3 has a system 4 for converting images. The system 4 for converting images produces original or output image data (Opti), which have an optimized brightness or color distribution, from the input image data (Ini) of the vehicle cameras (2-$i$). The optimized output image data from the individual vehicle cameras 2-$i$ are combined to create a composite overall image (so-called stitching). The overall image combined by the image processing unit 3 from the optimized image data (Opti) is subsequently displayed to a user by a display unit 5. In one possible embodiment, the system 4 for converting images is formed by an independent hardware circuit which converts the brightness or the color distribution. In an alternative embodiment, the system executes program instructions when carrying out a method for converting images.

The data processing unit 3 may have one or more image processing processors, wherein it converts the camera images or video data received from the various vehicle cameras 2-$i$ and subsequently combines them to create a composite overall image (stitching). In one possible embodiment, the system 4 for converting images is formed by a processor provided for this purpose, which converts the brightness or the color distribution in parallel with the other processor or processors of the data processing unit 3. The time required to process the image data is reduced by the parallel data processing.

Figure 2:
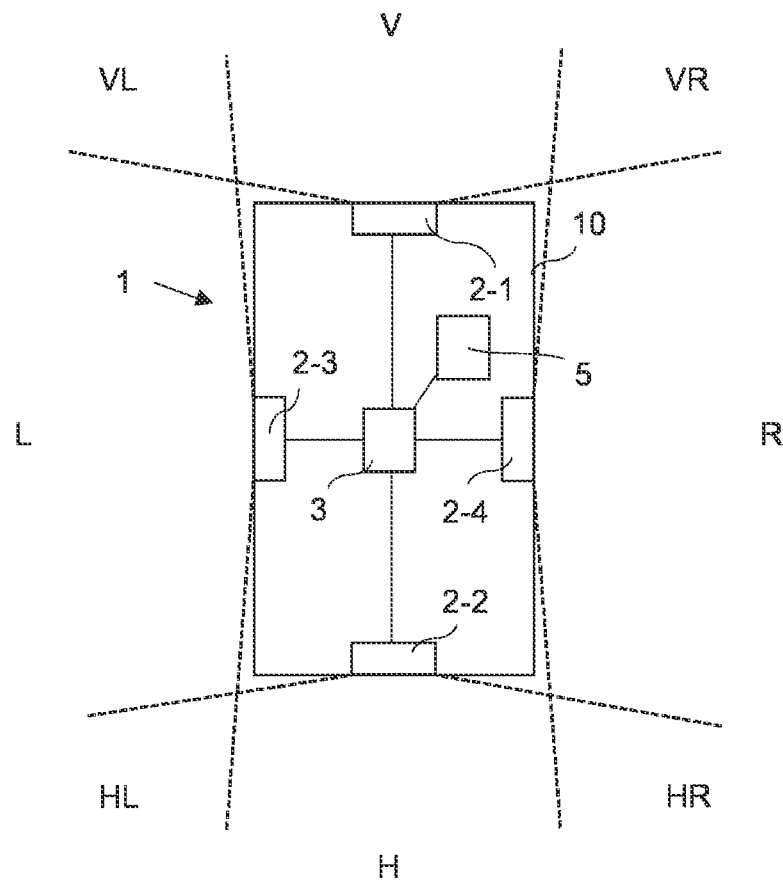
FIG. 2: shows a second schematic representation of a device according to the present disclosure in an embodiment in a vehicle.

FIG. 2 shows a further schematic representation of a device 1 according to the present disclosure in one configuration. The device 1 depicted in FIG. 2 is utilized in a surround-view system of a vehicle 10, in particular of a passenger car or a truck. In this case, the four different vehicle cameras 2-1, 2-2, 2-3, 2-4 may be located on different sides of the vehicle 10 and have corresponding viewing regions (dashed lines) in front of V, behind H, on the left L and on the right R of the vehicle 10.

For example, the first vehicle camera 2-1 is located on a front side of the vehicle 10, the second vehicle camera 2-2 is located on a rear side of the vehicle 10, the third vehicle camera 2-3 is located on the left side of the vehicle 10 and the fourth vehicle camera 2-4 is located on the right side of the vehicle 10. The camera images from two neighboring vehicle cameras 2-$i$ have overlapping image regions VL, VR, HL, HR. In one possible embodiment, the vehicle cameras 2-$i$ are so-called fisheye cameras which have a viewing angle of at least 185°. The vehicle cameras 2-$i$ may transmit the camera images or camera image frames or video data, in one possible embodiment, via an Ethernet connection to the data processing unit 3. The data processing unit 3 calculates a composite surround-view camera image from the camera images of the vehicle cameras 2-$i$, which is displayed to the driver and/or a passenger on the display 5 of the vehicle 10. In some cases, the light conditions in the surroundings differ from one another at the front vehicle camera 2-1 and at the rear vehicle camera 2-2 while driving, for example when entering a vehicle tunnel or when entering a vehicle garage.

When the surroundings of the vehicle 10 are dark, the activated headlights illuminate the front region V ahead of the vehicle 10 with white light of a relatively high intensity, while the taillights illuminate the rear region H behind the vehicle with red light of medium intensity. In contrast, the regions to the left L and right R next to the vehicle 10 are virtually unlit.

When an artificial neural network is simultaneously or jointly trained with dark images (for example, for the side cameras 2-3, 2-4) and bright images (for example, for the front 2-1 and rearview cameras 2-2), the neural network learns optimal parameters.

During the joint training for multiple vehicle cameras 2-*i*, ground truth data, which have a brightness and balance which are applied to all of the target cameras 2-1, 2-2, 2-3, 2-4, are used in a first application. In other words, the ground truth data for all target cameras 2-1, 2-2, 2-3, 2-4 are balanced out in such a manner that, for example, in the case of a surround-view application, no differences in brightness may be recognized in the ground truth data. A neural network CNN1, CNN10, CNN11, CNN12 is trained in terms of an optimal set of parameters for the network, using this ground truth data as the reference and the input data from the target cameras 2-1, 2-2, 2-3, 2-4, which may have different brightnesses. This data set may consist, for example, of images having white headlights and red taillights for the front cameras 2-1 and rear cameras 2-2, respectively, and dark images for the side cameras 2-3, 2-4. Data having differently illuminated side regions L, R are likewise conceivable, for example if the vehicle 10 is located next to a street lamp, or the vehicle 10 has an additional light source on one side.

In a further application, the neural network may be trained for the joint cameras 2-*i* in that, even in the case of missing training data and ground truth data for a camera, for example of a side camera 2-3 or 2-4, the network trains and optimizes the parameters for these cameras 2-3 or 2-4 with the missing data based on the training data of the other cameras 2-1, 2-2 and 2-4 or 2-3. This may be achieved, for example, as a restriction (or constraint) in the training of the network, for example as an assumption that the correction and training must always be the same due to similar lighting conditions of the side cameras 2-3 and 2-4.

In a final example, the neural network utilizes training and ground truth data which differ temporally and which are correlated with the cameras 2-*i*, which have been acquired by the various cameras 2-*i* at different points in time. To this end, information from features or objects and the ground truth data thereof may be used which have, for example, been acquired at a point in time t by the front camera 2-1 and at a point in time t+n by the side cameras 2-3, 2-4. These features or objects and the ground truth data thereof may replace missing information in the training and ground truth data of the other cameras, respectively, if they are used in the images of the other cameras 2-*i* and then by the network as training data. In this way, the network may optimize the parameters for all the side cameras 2-3, 2-4 and, if necessary, may compensate for any missing information in the training data.

When using multiple vehicle cameras 2-*i*, this leads to an adapted brightness and balance for all of the vehicle cameras 2-*i*, since the individual lighting profiles in the exterior space are explicitly captured and trained in the overall network.

Figure 3:
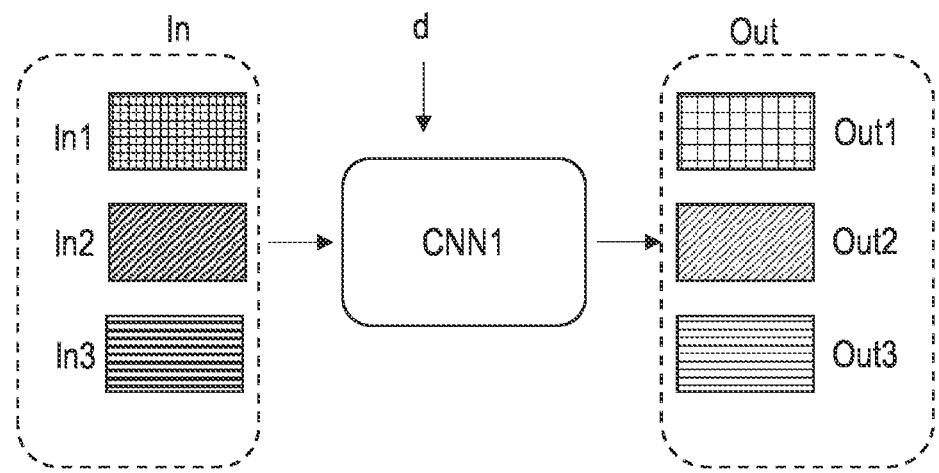
FIG. 3: schematically shows a general overview of a system for converting or enhancing the vision of vehicle camera images.

FIG. 3 schematically shows a general overview of a system for converting or enhancing the vision of camera images. A component is an artificial neural network CNN1 which learns, during a training phase, to assign a set of corresponding vision-enhanced images Out (Out1, Out2, Out3, . . . ) to a set of training images In (In1, In2, In3, . . . ). Here, assigning means that the neural network CNN1 learns to generate a vision-enhanced image. A training image (In1, In2, In3, . . . ) may contain, e.g., a street scene at dusk, on which only a further vehicle located immediately in front of the vehicle and the sky may be recognized with the human eye. On the corresponding vision-enhanced image (Out1, Out2, Out3, . . . ), the contours of the further vehicle, a sidewalk as a road boundary and adjacent buildings may also be recognized.

A factor d may preferably serve as an additional input variable for the neural network CNN1. The factor d is a measure of the degree of vision enhancement. During training, the factor d for an image pair constituting the training image and the vision-enhanced image (In1, Out1; In2, Out2; In3, Out3; . . . ) may be established in advance and provided to the neural network CNN1. When utilizing the trained neural network CNN1, it is possible to control, by predefining a factor d, how strongly the neural network CNN1 "lightens up" or "darkens" an image—the factor d may also be imagined as an external regression parameter (not only bright—dark, but with any gradation). Since the factor d may be subject to possible fluctuations in the range of +/−10%, this is taken into account during the training. The factor d may be noisy during the training by a figure of approx. +/−10% (e.g., during the different periods of training the neural network), in order to be robust against incorrect estimations of the factor d in the range of approx. +/−10% during the inference in the vehicle. In other words, the necessary accuracy of factor d lies in the range of +/−10%. Consequently, the neural network CNN1 is robust with respect to deviations in estimations of this parameter.

One possible way of producing the training data (training images (In1, In2, In3, . . . ) and assigned vision-enhanced images (Out1, Out2, Out3, . . . )) includes acquiring image data of a scene, each having a short exposure time and, simultaneously or immediately following one another, having a long exposure time. In addition, image pairs (In1, Out1; In2, Out2; In3, Out3; . . . ) having different factors d may be acquired for a scene in order to thus learn a continuous spectrum for the vision enhancement depending on the parameter or factor d. The vehicle camera 2-*i* may be stationary (immobile) with respect to the surroundings to be captured during the production of the training data. For example, the training data may be captured by means of a vehicle camera 2-*i* of a stationary vehicle 10. The scene captured by the vehicle camera 2-*i* may in particular include static surroundings, that is to say without moving objects.

When the neural network CNN1 has been trained, the vision is enhanced according to the following model:
Input image→CNN1
Factor d→CNN1
CNN1→vision-enhanced original/output image.

Figure 4:
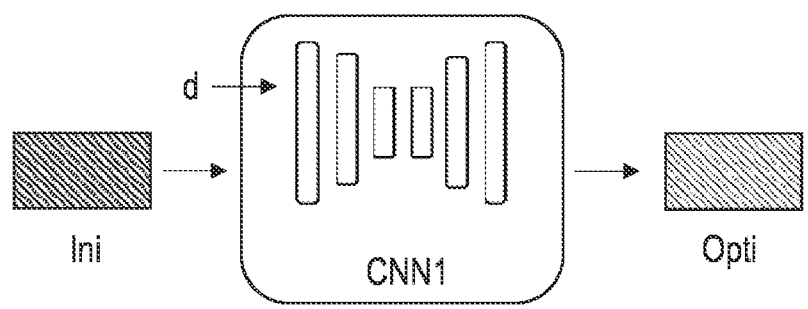
FIG. 4: shows a system having a first neural network for enhancing vision.

FIG. 4 shows a system having a trained neural network CNN1 for enhancing vision. The trained neural network CNN1 receives original input image data (Ini) from the multiple cameras 2-*i* as the input. A factor d may be predefined or determined by the neural network CNN1 itself on the basis of the input image data (Ini). The factor d predefines (controls) how strongly the input image data are to be converted. The neural network calculates vision-enhanced image data (Opti) from the multiple cameras 2-$i$. The optimized image data (Opti) of the multiple cameras 2-$i$ are output.

Figure 5:
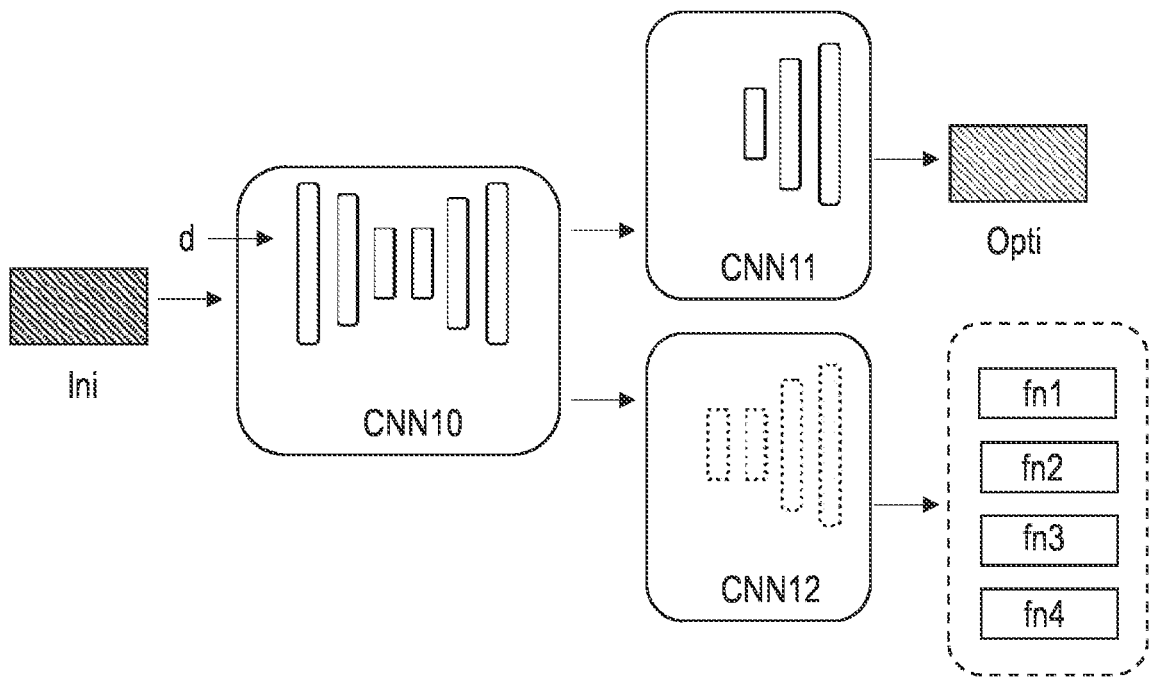
FIG. 5: shows a neural network for enhancing the vision of an input image, which shares feature representation layers with a second network for the detection functions and has two outputs.
Figure 6:
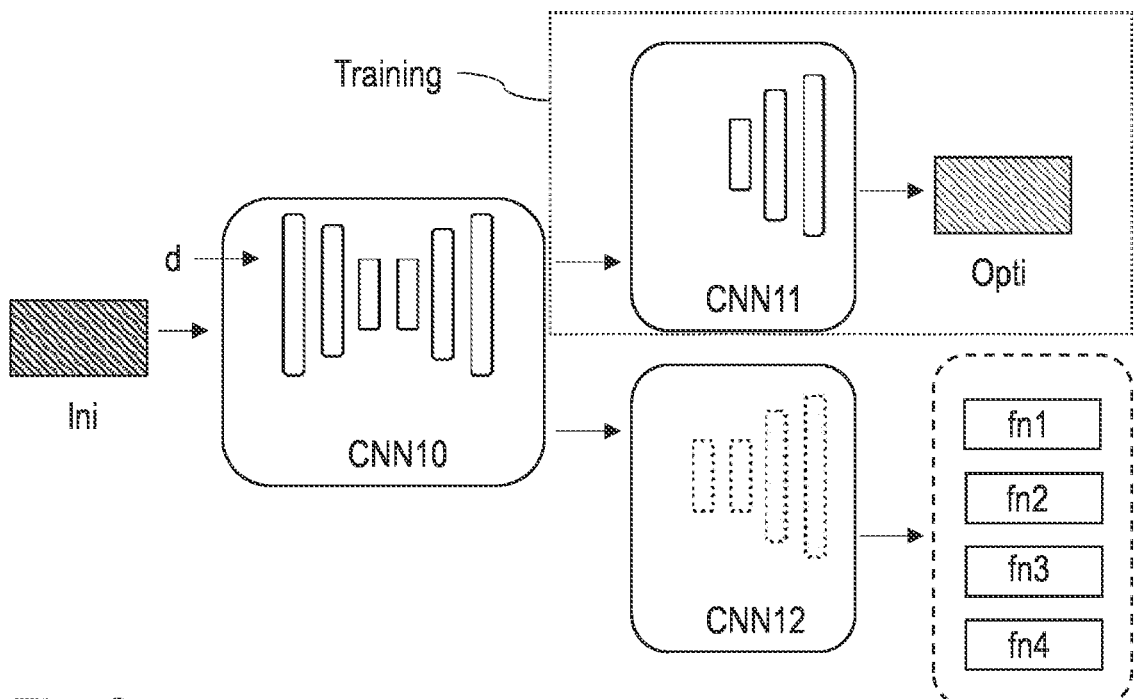
FIG. 6: shows a modified approach based on FIG. 5.

FIGS. 5 and 6 show example embodiments for possible combinations of a first network for enhancing vision with one or more networks of the functions for driver assistance functions and automated driving.

FIG. 5 shows a neural network CNN10 for enhancing the vision of an input image (Ini), possibly controlled by a factor d, which shares feature representation layers (as input or lower layers) with a network for detection functions (fn1, fn2, fn3, fn4). In this case, the detection functions (fn1, fn2, fn3, fn4) are image processing functions which detect objects, structures, properties (generally: features) in the image data, which are relevant to ADAS or AD functions. Many such detection functions (fn1, fn2, fn3, fn4), which are based on machine learning, have already been developed or are the subject of current developments (e.g., traffic sign classification, object classification, semantic segmentation, depth estimation, lane marking recognition and localization). Detection functions (fn1, fn2, fn3, fn4) of the second neural network CNN2 deliver better results for vision-enhanced images (Opti), than for the original input image data (Ini) in poor visibility conditions. In the feature representation layers of the neural network CNN 10, common features for the vision enhancement and for the detection functions are learned.

The neural network CNN10 having shared input layers and two separate outputs has a first output CNN 11 for outputting the vision-enhanced original/output image (Opti) and a second output CNN 12 for outputting the detections: objects, depth, lane, semantics, etc.

The fact that the feature representation layers are optimized during the training both in terms of the vision enhancement and the detection functions (fn1, fn2, fn3, fn4) means that an optimization of the vision enhancement likewise brings about an enhancement in the detection functions (fn1, fn2, fn3, fn4).

If an output of the vision-enhanced image (Opti) is not desired or not required, the approach may be varied further, as explained with reference to FIG. 5.

FIG. 6 shows an approach based on the system of FIG. 5 for neural network-based vision enhancement by optimizing the features. In order to save computing time, the features for the detection functions (fn1, fn2, fn3, fn4) are optimized during the training in terms of vision enhancement and in terms of the detection functions (fn1, fn2, fn3, fn4).

During the runtime, i.e., when utilizing the trained neural network (CNN10, CNN11, CNN 12), no vision-enhanced images (Opti) are calculated.

Nevertheless, the detection functions (fn1, fn2, fn3, fn4)—as already explained—are enhanced by the joint training of vision enhancement and detection functions, compared with a system having only one neural network (CNN2) for detection functions (fn1, fn2, fn3, fn4), in which only the detection functions (fn1, fn2, fn3, fn4) have been optimized as well during the training.

During the training phase, the brightness-enhanced image (Opti) is output by an additional output interface (CNN11) and compared with the ground truth (the corresponding vision-enhanced training image). This output (CNN11) may continue to be used during the test phase or during the runtime, or it may be truncated to save computing time. The weightings for the detection functions (fn1, fn2, fn3, fn4) are modified during this training with the additional output (CNN11) in that they take into account the brightness enhancements for the detection functions (fn1, fn2, fn3, fn4). The weightings of the detection functions (fn1, fn2, fn3, fn4) consequently implicitly learn the information about the brightness enhancement.

Further aspects and embodiments of an assistance system based on surround-view cameras, which algorithmically converts the image data, despite the darkness and lack of color information, into a representation which corresponds to a photograph with illumination or daylight are set out below. The converted image may either serve for purely display purposes or as an input for feature-based recognition algorithms.

1a) In a first embodiment, the calculation in a system is based, for example, on a neural network which, upstream of a detection or display unit, converts a very dark input image having little contrast and color information into a representation which is, for example, as bright as day. For this task, the neural network was trained with a data set consisting of "dark input images" and the associated "images as bright as day".

This training may be carried out individually for each vehicle camera so that a conversion takes place individually for each individual vehicle camera. Individual training for each vehicle camera offers the advantage of redundancy in the overall system. Depending on the type of training, the neural network may reproduce processes such as white balancing, gamma correction and histogram equalization in a very ideal way, and utilize additional information stored in the network structure to automatically add missing color or contrast information. In this way, very dark images may be converted into a representation which is advantageous for feature-based recognition and viewing.

1b) In alternative training, all of the vehicle cameras may also be trained simultaneously. The advantage of this would be that the network learns optimal parameters during simultaneous training with dark images (for example for the side cameras) and bright images (for example, for the front and rearview cameras). When using multiple vehicle cameras, this leads to an adapted brightness and balance for all of the vehicle cameras, since the individual lighting profiles in the exterior are explicitly captured and trained in the overall network.

During training, predefining corresponding target output images (ground truth data) makes it possible for the network to learn to convert the different images from the individual vehicle cameras into images having optimized brightness and/or color distribution. For example, it may be deemed to be optimal that the brightness or color distribution in the overlapping field of view of neighboring vehicle cameras are the same or virtually the same. By using ground truth data for all of the vehicle cameras, which all correspond to the optimized image of the front camera in terms of brightness or color distribution, the converted images from all of the vehicle cameras are ideal later, when the trained neural network is utilized, in order to produce a composite image for the display unit therefrom by means of stitching.

In one embodiment, the training may provide ground truth data which are the result of an image simulation or an image synthesis. For example, the target output images from the side vehicle cameras may be simulated or synthesized, taking real front and rear images into account.

In a further embodiment, this method may be integrated in a hardware-based image pre-processing stage, the ISP (Image Signal Processor). This ISP is supplemented, in terms of hardware, by a small, trained neural network, which performs the corresponding conversion and makes the processed information with the original data available to possible detection or display methods.

This method may be utilized in a further application in that, as in the case of a surround-view system, it adds together images having different lighting profiles to form an overall image having balanced lighting. One example is displaying the vehicle surroundings on a display in the case of an unlit country road, where the regions of the front and rear vehicle cameras are illuminated by headlights and taillights, but the lateral regions are not illuminated by said lights.

In a further embodiment, the system may be trained with the neural network to utilize information from the better-lit regions in order to further improve the conversion for the unlit regions. Here, the network is individually trained less with individual images for each vehicle camera, but rather as an overall system consisting of multiple camera systems.

In a further application, in addition to lighting information and image data, information regarding the image quality may be made available to the network for training. The system and the method may be optimized in that it calculates optimized image data for computer vision and human vision.

In a further embodiment, the computing efficiency is optimized. To this end, no separate neural network is required for the reconstruction of the vision-enhanced night images; instead, one of the operational networks in the vehicle is enlisted to this end, e.g., a network for semantic segmentation, lane recognition, object recognition or a multi-task network.

One or more further output layer(s) is/are added to this network, which is/are responsible for the reconstruction of the vision-enhanced night images. During the training, the training data for the night vision enhancement are used for the calculation of this output layer.

During the runtime in the vehicle, two different embodiments may be implemented:
 a) The reconstruction of the vision-enhanced photographs is made available to further functions: here, the output of the extended output layers is required. This output is calculated and the vision-enhanced images are made available to the functions, e.g., for a display for the driver.
 b) The direct reconstruction of the vision-enhanced photographs is not required: since a common network is used for the function(s) and the vision enhancement, a significant enhancement in the feature representation of the individual layers for the functions takes place, in this case, during the training. This is attained by the following network structure: the network layers are attained both for the functions and for the enhancement of the vision; only the output layers of the functions and the vision enhancements contain separate neurons for the function or the vision enhancement; and the training of the network comprises data for the function and the vision enhancement.

This setup makes it possible for the feature representation of the jointly used layers to contain information about the vision enhancement, and for this information to be made available to the functions. During the runtime, there is consequently the possibility of using the network only for calculating the functions which, to this end, work on vision-enhanced feature representations. This is a computing time-efficient implementation which is in particular suitable for operation on embedded systems.

The additional computational cost during the runtime, in this embodiment, is either only the calculation of the output layer(s) if the vision-enhanced night images are made available to further functions in the vehicle, or no additional computational cost if the vision enhancement is integrated into the algorithms of the functions and only the output of these functions continues to be used, e.g., lane recognition, object recognition, semantic segmentation and/or depth estimation.

The vision enhancement may be extended in terms of overexposure for the application in road traffic. With the methods described here, a common network for enhancing vision may be learned, which improves both the quality of overexposed and underexposed photographs. A fusion of these two applications in a network makes it possible to implement them in the vehicle in a computationally efficient manner. Furthermore, the computational efficiency may be increased if this network fusion is likewise expanded to the functions such as object recognition, lane recognition, depth estimation, or semantic segmentation.

During the runtime, only the photographs of the vehicle cameras are required and, optionally, an estimation of the relationship/factor d, which describes the enhancement in vision achieved between the input image and the output image. This may be described, for example, by the relationship of the exposure time between the input and output image.

Other relationships for measuring such a relationship are also conceivable.

That is to say, the network calculates, based on the input data (=a photograph having a short exposure time), a vision-enhanced image which corresponds to a photograph having a longer exposure time.

In the vehicle, the exposure time is limited, especially in the case of night photographs, so as not to adversely affect the quality of the photograph by the driving speed or in curves (including, inter alia, motion blur). In combination with the proposed network for enhancing vision, images having a longer exposure time are calculated without these being adversely affected by, e.g., the driving speed.

The estimation of the relationship (or factor d) may be obtained from the current image, the previous image or a sequence of images. To this end, an example is the change from an illuminated city center to a country road.

To this end, a control loop may be set up, in which the properties of the luminance histogram are tracked. If a deviation from the mean expected distribution occurs, the relationship may be increased or decreased.

This adjustment of the relationship is relevant to the runtime in the vehicle. During the training, the relationships between the exposure times are known, and the mean expected distribution for the vision enhancement may be calculated from the ground truth images of the training data for various scenes. The scene types may be obtained from the functions during the runtime in the vehicle, e.g., semantic segmentation.

Consequently, the relationship to the vision enhancement during the runtime may a) be a constant, b) depend on the luminance histogram, c) depend on the street scene, or d) depend on the luminance histogram and the street scene.

In summary, deviations from a fixed vision enhancement factor d may occur in dynamic scenes such as road traffic scenes. By regulating this factor, it is possible to enhance the vision for a large number of different traffic scenes during the runtime in the vehicle.

The main advantages associated with the example embodiments are:
 Very efficient method for increasing the image quality when there is insufficient lighting;

Significant enhancement in the image quality when displaying night images;

No additional lighting is required, which lightens up regions of the vehicle such as the side regions with no lighting. This may constitute a unique selling point for ADAS; and Generation of an image data stream for human and computer vision from a network.

In addition to motor vehicles, alternative areas of application are, for example, airplanes, ships, drones, buses and trains.

The invention claimed is:

1. A method for machine learning of a conversion of input image data from a plurality of vehicle cameras of a panoramic view system into enhanced output image data by at least one artificial neural network, wherein the machine learning is effected with a multiplicity of training image pairs in such a manner that a first image having a first brightness or color distribution is provided at the input of the at least one artificial neural network and a second image of the same scene having a different second brightness or color distribution, respectively, is provided as a target output image, wherein the first brightness or color distribution comprises the first brightness distribution and the different second brightness or color distribution comprises the different second brightness distribution, and at least one factor is established as a measure of a difference between the t second brightness distribution and the first brightness distribution of a training image pair and is provided to the at least one artificial neural network.

2. The method according to claim 1, wherein the training image pairs are produced for each of the plurality of vehicle cameras in that the first image having a first brightness and the second image having a second brightness are acquired simultaneously or immediately one after another with different exposure times.

3. The method according to claim 1, wherein the at least one artificial neural network is trained jointly for all of the plurality of vehicle cameras.

4. The method according to claim 1, wherein the at least one artificial neural network has a common input interface and two separate output interfaces, wherein the common input interface has shared feature representation layers, wherein brightness-converted image data are output at the first output interface, wherein ADAS-relevant detections of at least one ADAS detection function are output at the second output interface and wherein the outputs of both output interfaces are enhanced as part of the training.

5. A method for converting input image data from a plurality of vehicle cameras of a panoramic-view system into enhanced output image data, the method comprising:
a) input image data acquired by the plurality of the vehicle cameras and having a current brightness or color distribution are provided to a trained artificial neural network;
b) the trained artificial neural network is configured to convert the input image data having the current brightness or color distribution into enhanced output image data having different output brightness or color distribution, respectively; and
c) the trained artificial neural network is configured to output the enhanced output image data wherein a factor is additionally provided to the trained artificial neural network during the input image data acquisition in block a) and the conversion is controlled as a function of the factor in the conversion of the input image data in block b).

6. The method according to claim 5, wherein the factor is estimated and, during the estimation, the current brightness or color distribution of the input image data, previously captured image data and/or a history of the factor is/are taken into account.

7. The method according to claim 5, wherein a separate factor is estimated or determined for each of the plurality of the vehicle cameras.

8. A non-transitory memory storing a computer program, the computer program, when executed by a data processing unit having at least one processor, configures the data processing unit to carry out the method according to claim 5.

9. The method according to claim 5, wherein the trained artificial neural network has a common input interface and two separate output interfaces, wherein the common input interface has shared feature representation layers, wherein brightness-converted image data are output at the first output interface, and wherein ADAS-relevant detections of at least one ADAS detection function are output at the second output interface.

10. The method according to claim 5, wherein the trained artificial neural network is part of an on-board ADAS detection neural network having a shared input interface and two separate output interfaces, wherein a first output interface of the two separate output interfaces is configured to output the enhanced output image data and a second output interface of the two separate output interfaces is configured to output ADAS-relevant detections.

11. A device having at least one data processing unit comprising at least one processor, the data processing unit configured to convert input image data from a plurality of vehicle cameras of a panoramic-view system into enhanced output image data, comprising:
an input interface which is configured to receive the input image data having a current brightness or color distribution from the plurality of the vehicle cameras;
a trained artificial neural network which is configured to convert the input image data having the current brightness or color distribution into output image data having a different output brightness or color distribution;
wherein the trained artificial neural network is part of an on-board ADAS detection neural network having a shared input interface and two separate output interfaces, wherein a first output interface of the two separate output interfaces is configured to output the enhanced output image data, and wherein a second output interface of the two separate output interfaces is configured to output ADAS-relevant detections.

12. The device according to claim 11, wherein the data processing unit is implemented in a hardware-based image pre-processing stage.

13. The device according to claim 11, wherein the shared input interface has shared feature representation layers, wherein the brightness-converted or color-converted image data are output at the first output interface, and wherein the ADAS-relevant detections are of at least one ADAS detection function and are output at the second output interface.

14. The device according to claim 11, wherein a factor is additionally provided to the trained artificial neural network and the conversion is controlled as a function of the factor in the conversion of the input image data.

15. The device according to claim 14, wherein the factor is estimated and, during the estimation, the brightness or color distribution of current image data, previously captured image data and/or a history of the factor is/are taken into account.

16. The device according to claim 14, wherein a separate factor is estimated or determined for each of the plurality of the vehicle cameras.

\* \* \* \* \*